United States Patent
Kondratenko

[11] 3,900,779
[45] Aug. 19, 1975

[54] STARTING AND REGULATOR DEVICE FOR ASYNCHRONOUS MOTORS WITH A WOUND ROTOR

[75] Inventor: Ivan Yakovlev Kondratenko, Sofia, Bulgaria

[73] Assignee: Nipkiep, Sofia, Bulgaria

[22] Filed: Aug. 18, 1972

[21] Appl. No.: 281,997

[30] Foreign Application Priority Data
Aug. 25, 1971 Bulgaria .............................. 18434

[52] U.S. Cl. .............................. 318/197; 318/237
[51] Int. Cl. ................................................ H02k 17/34
[58] Field of Search ............ 318/197, 240, 241, 237

[56] References Cited
UNITED STATES PATENTS

| | | |
|---|---|---|
| 3,217,222 | 11/1965 | Lee ............................. 318/240 |
| 3,327,189 | 6/1967 | Hedstrom ..................... 318/197 X |
| 3,379,947 | 4/1968 | Lalonde ....................... 318/240 X |
| 3,531,701 | 9/1970 | Shibata ........................ 318/237 X |
| 3,549,968 | 12/1970 | Shibata ........................ 318/237 X |
| 3,586,935 | 6/1971 | Lundelius, Sr. ............... 318/237 X |

*Primary Examiner*—B. Dobeck
*Attorney, Agent, or Firm*—Karl F. Ross; Herbert Dubno

[57] ABSTRACT

A motor system in which an induction phase shifter is included in the rotor windings by its excitation winding and has two control windings connected electrically in series, one of which is in the stator coil while the other is in the phase shifter rotor. Condensers are included in the motor rotor winding.

3 Claims, 11 Drawing Figures

3,900,779

STARTING AND REGULATOR DEVICE FOR ASYNCHRONOUS MOTORS WITH A WOUND ROTOR

FIELD OF THE INVENTION

My present invention relates to a start-regulating circuit for asynchronous motors having wound rotors and including controlled rectifiers for commutation of the rotor current.

BACKGROUND OF THE INVENTION

Starting circuits for asynchronous motors having wound rotors have been provided heretofore with controllable semiconductor rectifiers for direct commutation of the rotor current. These thyristor circuits were used for different types of electrical drives and electric motors of a wide range of power, requiring smooth starting and stepless speed control of the motor. This commutation technique has not received the widespread application which might be expected because of the difficulties of controlling the rectifiers. The prior-art systems for this purpose have the common disadvantage of undue complexity and unreliability and require skilled personnel for maintenance and repair. The systems for direct control of the rotor current use an asynchronous motor with a wound rotor, the connection between the rotor winding and the commutating controlled rectifiers being effected by sliprings and brushes. This has obvious disadvantages.

OBJECT OF THE INVENTION

It is the principal object of the invention to provide a control system for asynchronous electric motors having a wound rotor and controlled rectifiers in circuit with the rotor winding whereby the aforementioned disadvantages are obviated.

SUMMARY OF THE INVENTION

This object and others which will become apparent hereinafter are attained, in accordance with the present invention, by using a controlling element in the form of an induction phase shifter supplied with the rotor voltage U2 which triggers the controlled rectifiers without the aid of other elements or devices, changing the firing phase angle of the rectifiers within a relatively wide range from 0° to 180°, synchronizing the rotor frequency $f2$ with the rectifier frequency, compensating for excess rotor voltage at low motor speeds, stabilizing the output control voltage in a range of 2 to 4 volts, and forming a steep wave front of the firing signal.

More specifically, the invention comprises a motor control circuit having controlled rectifiers which may be connected to the motor in any conventional circuit diagram. In one embodiment of the invention, a reciprocal-parallel circuit is employed whereby, in one phase direction, a controlled rectifier is in circuit with the motor winding whereas in the other phase direction a noncontrolled diode is employed. The circuit of the invention thus includes a diode reverse-biased, connected across the principal electrodes of the thyristor.

The use of thyristors as the controlled rectifiers has been found to be advantageous since they operate in conventional circuitry which the present invention exploits by firing when the gate is triggered with the positive half cycle of the rotor voltage U2 at a triggering point determined between the phase difference of the working voltage and current with respect to the basic rotor voltage. In the conventional system the power efficiency is diminished by the use of thyristors in this manner and the rotor current is increased. To avoid this disadvantage, the present invention provides a condenser battery in the rotor circuit.

According to another feature of the invention, a feedback network is provided to allow significant variation of the motor speed while maintaining effective stabilization.

The invention affords numerous advantages including smooth stepless speed control of an asynchronous motor with variations from the nominal speed to zero and even negative speed as in the case of motor braking, of utilizing a circuit which is completely contactless, of reducing power consumption in accordance with speed reduction, of utilizing, at least in some embodiments of the invention, a conventional motor without structural changes, of affording feedback control and stabilization of motor speed and of greater efficiency and simplicity.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
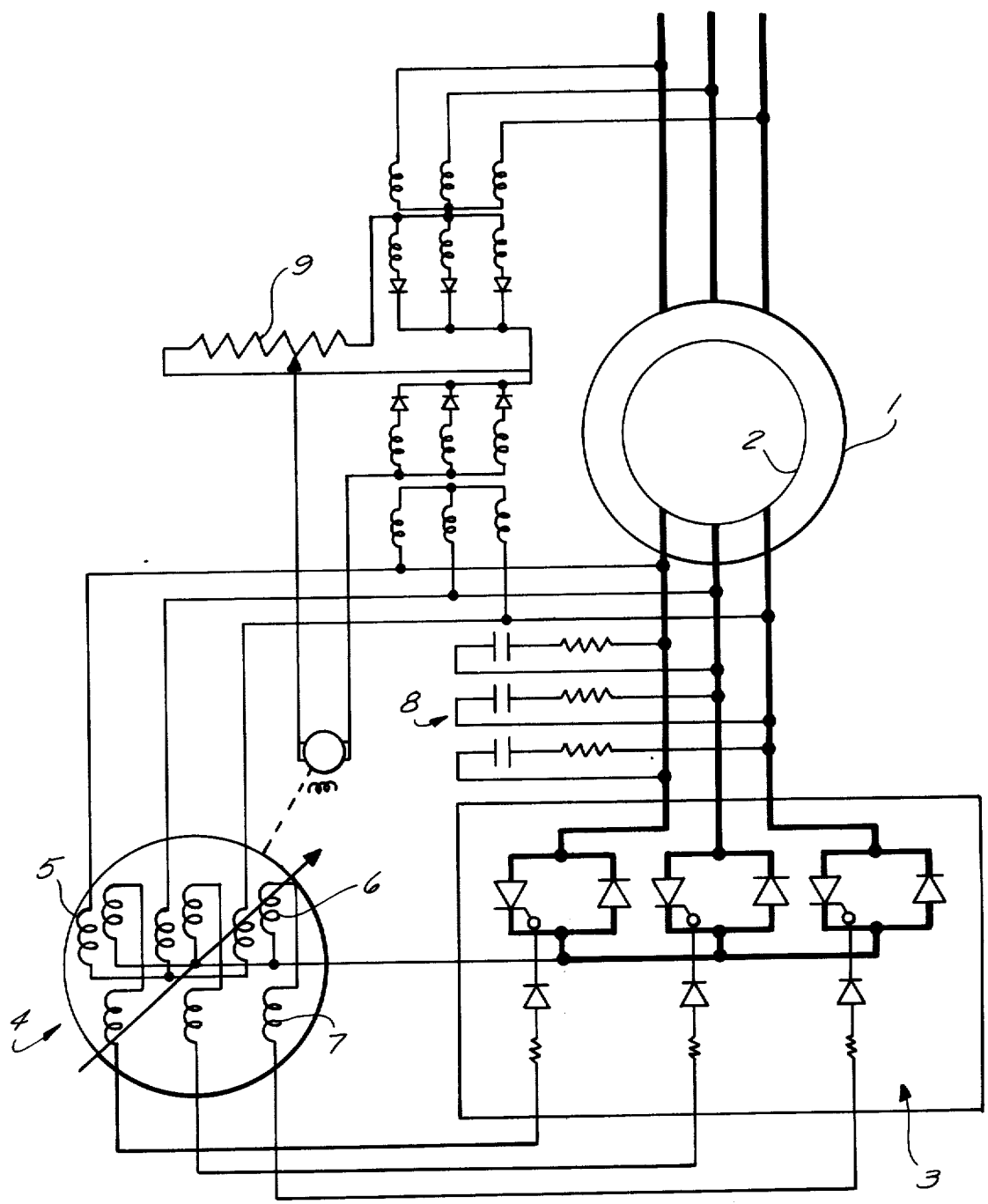
FIG. 1 is a circuit diagram showing a motor control system embodying the invention and utilizing a conventional wound-rotor asynchronous motor whose rotor is connected with a thyristor bank utilizing the usual sliprings of the motor.

In the system of FIG. 1, the motor 1, 2 has stator windings 1 which are fed from the usual three-phase line-current source and a rotor 2 to the windings of which a group of controlled rectifiers 3, having their principal electrodes bridged by oppositely biased diodes, are connected. The control device makes use of an induction phase shifter 4 having an exciting winding 5 in the phase shifter stator through which the rotor winding current is passed so that the voltage induced in the phase shifter corresponds to the highest rotor voltage. The rotor windings 7 of the phase shifter are connected to the gates of the controlled rectifiers and the neutral or zero point of the stator winding 6 is connected to the neutral or zero point of the bank of controlled rectifiers. Because the rectifiers shift back the rotor voltage and current phase with respect to the basic rotor voltage U2 and reduce the power efficiency (cos $\phi$), a condenser battery having condensers bridged across the rotor leads in pairs is provided at 8 to improve the power coefficient cos $\phi$. A feedback circuit includes transformer-rectifier inputs from the stator leads and the rotor leads to opposite sides of a potentiometer 9 so that when a potential difference exists, the d-c servomotor *m* is driven to displace the phase shifter rotor in one or the other direction and stabilize the motor speed.

Figure 2:
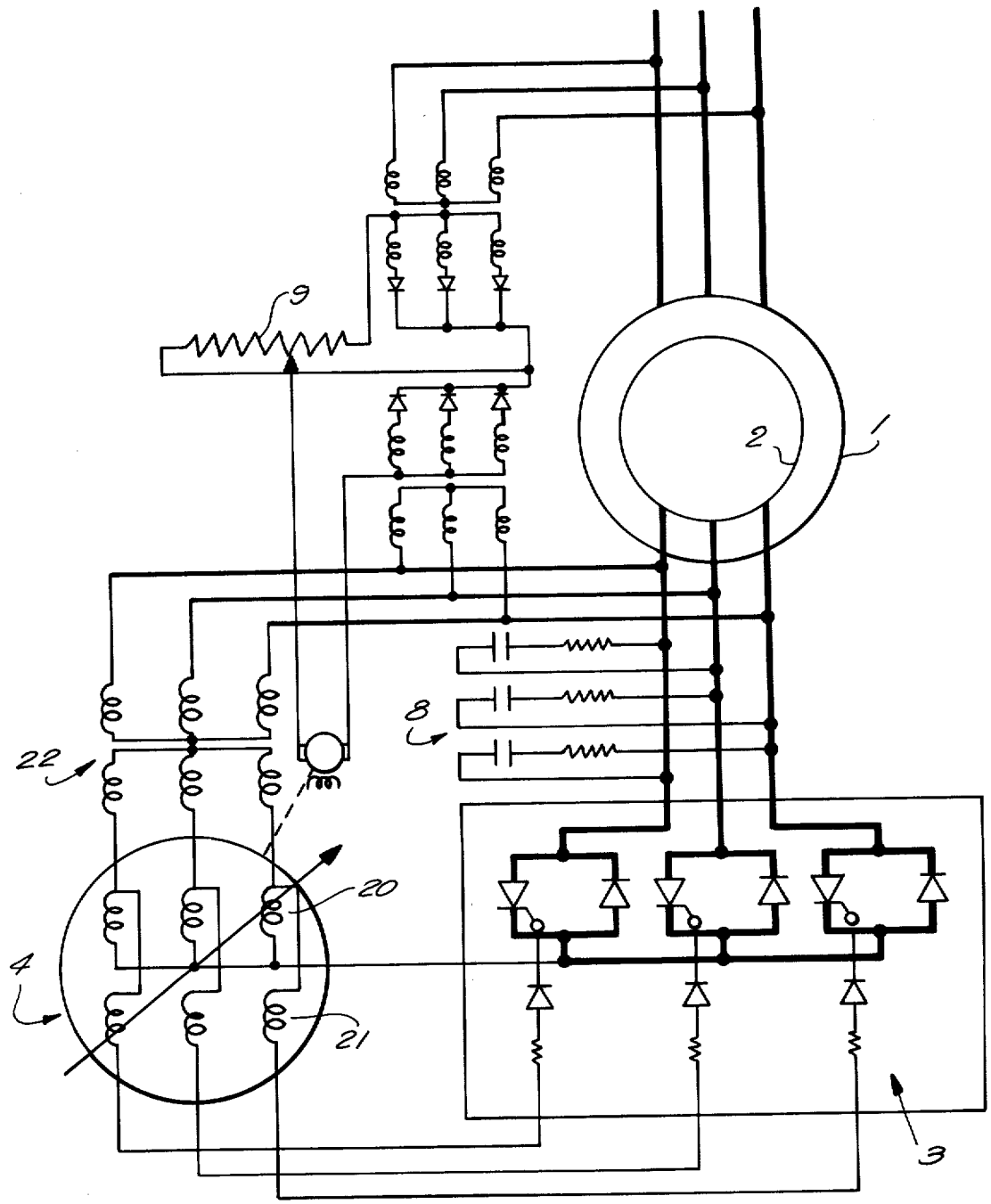
FIG. 2 is a diagram similar to FIG. 1 with some modifications of the circuit.

The circuit of FIG. 2 is generally similar in that it uses an asynchronous motor with a wound rotor, sliprings and brushes, but differs from the circuit of FIG. 1 in that the additional exciting winding 5 is omitted and the connection between phase shifter 4 and the rotor 2 is effected by a voltage transformer 22 whose primary receives the motor voltage and whose secondary delivers the phase shifter voltage. The phase shifter has a stator winding 20 and a rotor winding 21 connected as previously described to the thyristors, the input from the transformer being to the junction between the stator and rotor windings of the phase shifter.

Figure 3:
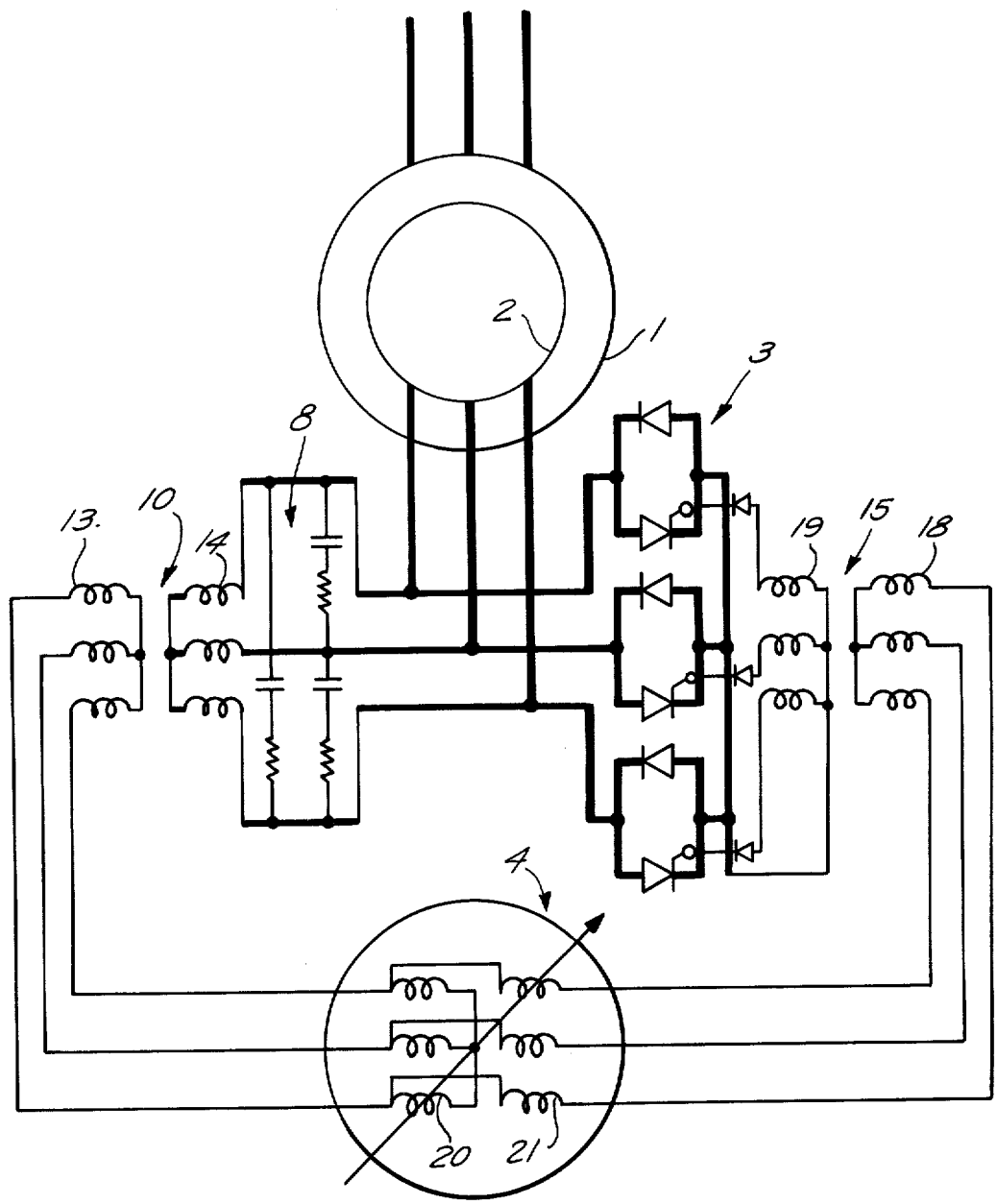
FIG. 3 illustrates still another circuit embodying the invention and which may make use of the structure of FIG. 7.
Figure 4:
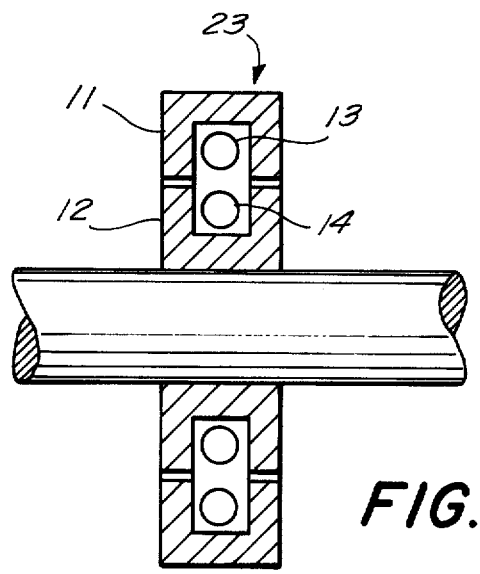
FIG. 4 shows the phase shifter in accordance with the invention.
Figure 5:
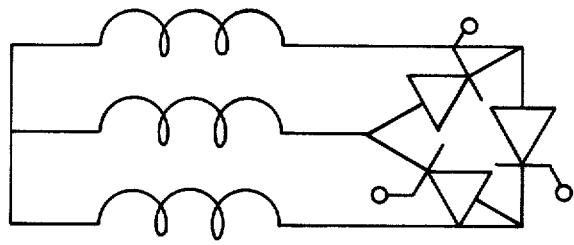
FIGS. 5 and 6 are circuit diagrams illustrating other thyristor circuits.
Figure 6:
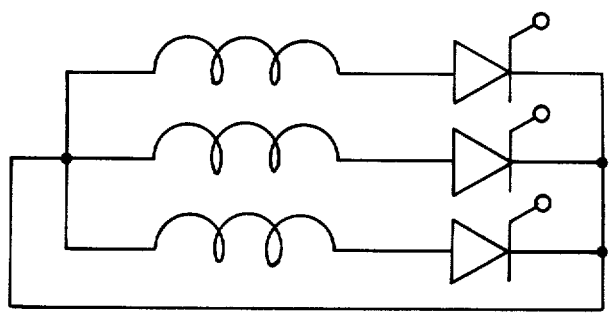
Figure 7:
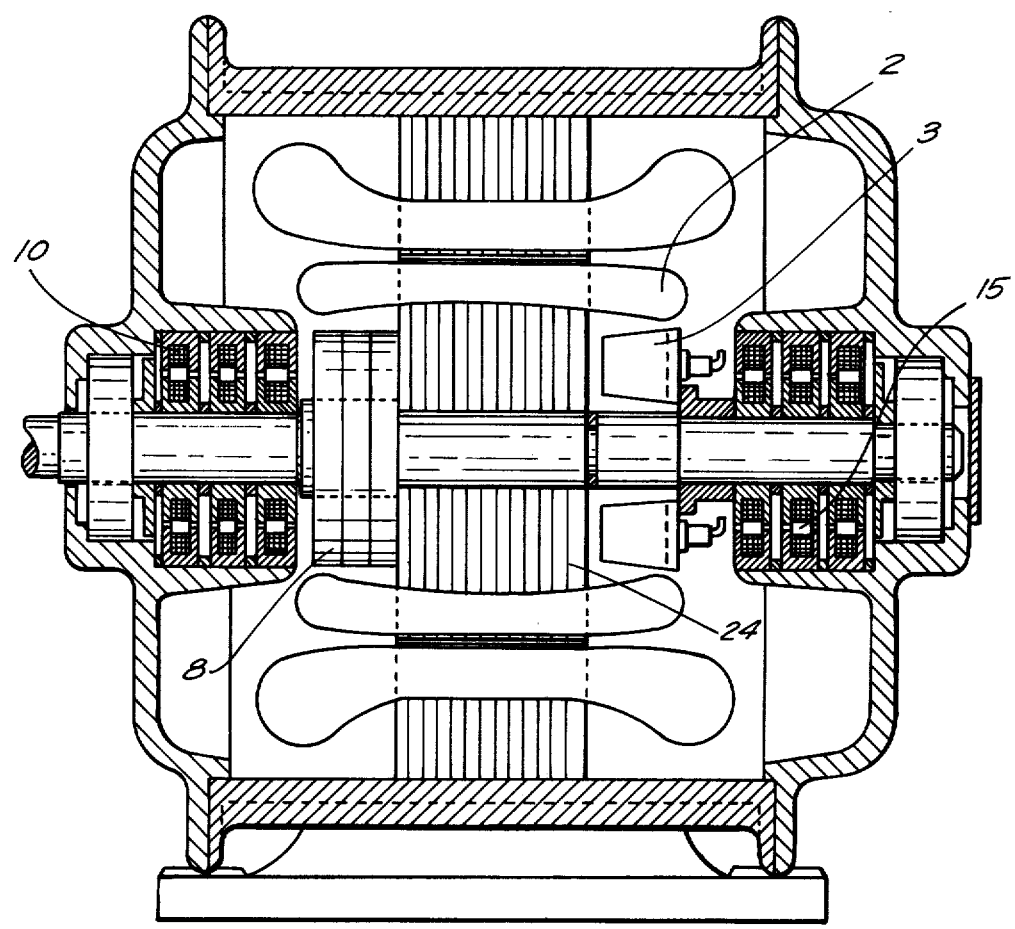
FIG. 7 is an axial cross-sectional view through a motor embodying the invention.
Figure 8A:
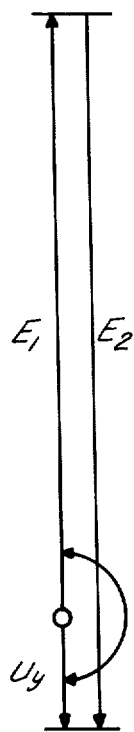
FIGS. 8a, 8b, 8c and 8d are diagrams illustrating phase relationships according to the invention.
Figure 8B:
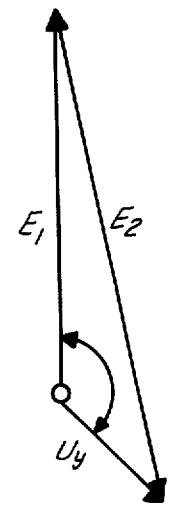
Figure 8C:
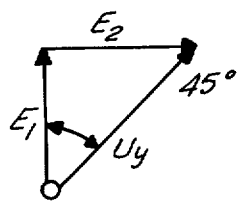
Figure 8D:
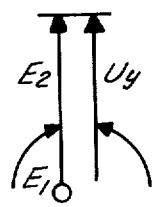

FIG. 3 shows the modification of the circuit in which the rectifier unit 3 is mounted on the motor shaft and is directly coupled with the rotor winding, the condensers 8 being likewise mounted on the rotor and connected to the rotor. The phase shifter is coupled by rotating transformers 10 and 15 with respective windings 13, 14, 18 and 19 in the circuit as described. The structure of this motor is illustrated in FIG. 7 and the motor has the advantage of being completely contactless. The operation of the various systems, which may use thyristor circuits as shown in FIGS. 5 and 6 and rotatable transformer networks as illustrated in FIG. 4, can best be understood by a consideration of the vector diagram of FIG. 8.

The stator vector E1 and the phase shifter rotor vector E2 are at their highest in the rest position of the motor, the rotor voltage U2 being a maximum. The phase shifter vectors are initially opposite and, because the rotor winding has more turns, the vector E2 has a higher voltage. The vector-addition sum, which is the control voltage, is about 2 to 4 volts and lags the motor rotor voltage by 180°. The rectifiers are blocked and the rotor current is practically zero (diagram 8*a*). When the phase shifter is rotated angularly, the vector sum remains 2 to 4 volts, but the angle of the control vector decreases, the rectifiers are fired and the current J2 flows in the rotor. If this current induces a torque higher than the load, the motor begins to run and stabilizes itself at a speed corresponding to the rotor position of the phase shifter (diagram 8*b*). The rotor voltage U2 and the voltages E1 and E2 decrease in accordance with motor speed although the control voltage remains 2 to 4 volts. If the phase shifter rotor is advanced further, the firing angle of the thyristors diminishes, the rotor current J2 increases and the motor speed stabilizes at a higher level (diagram 8*c*). At the nominal motor speed, the vectors E1 and E2 are almost parallel and of the same direction although the voltages U2, E1 and E2 are small and their vector sum defining the control voltage remains 2 to 4 volts (diagram 8*d*).

What we claim is:

1. A control system for an asynchronous motor having stator and rotor windings, a voltage being applied to said rotor windings, said system comprising a plurality of controlled rectifiers in circuit with said rotor windings, said controlled rectifiers having control electrodes; a rotary phase shifter having rotor windings inductively energized in response to the voltage applied to the motor rotor windings and directly connected through resistors and diodes to the control electrodes of said rectifiers, said control electrodes being unconnected except for the connections to said phase-shifter rotor windings through said resistors and diodes, said phase shifter rotor being angularly displaceable to control the firing time of said controlled rectifiers; and condensers connected in circuit with the motor rotor windings.

2. The system defined in claim 1 wherein said phase shifter rotor windings are connected in circuit with respective phase shifter stator windings, said system further comprising a voltage transformer for energizing said phase shifter stator windings from said motor rotor windings.

3. The system defined in claim 1, further comprising a rotating transformer coupling said phase shifter rotor windings with said controlled rectifiers.

* * * * *